No. 828,278. PATENTED AUG. 7, 1906.
J. FARRELL.
MACHINE FOR MAKING BASKETS.
APPLICATION FILED SEPT. 25, 1897.
5 SHEETS—SHEET 1.
Fig: 1.
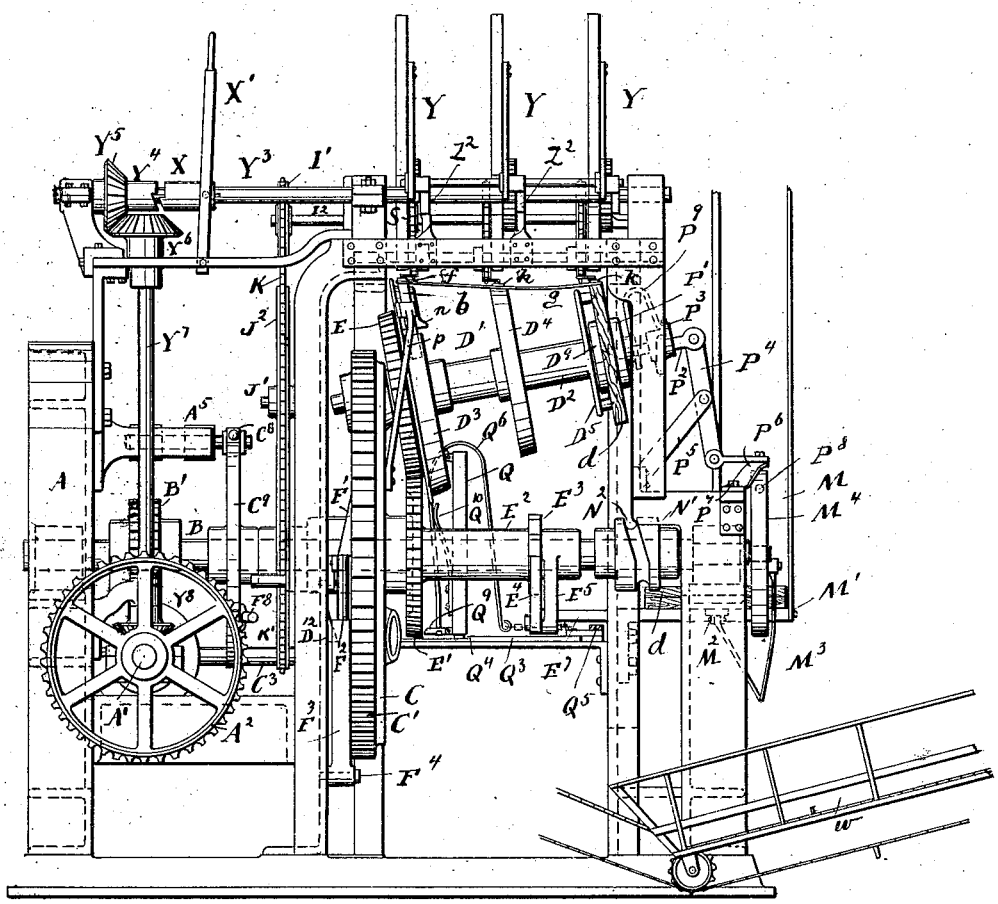
Fig: 2.
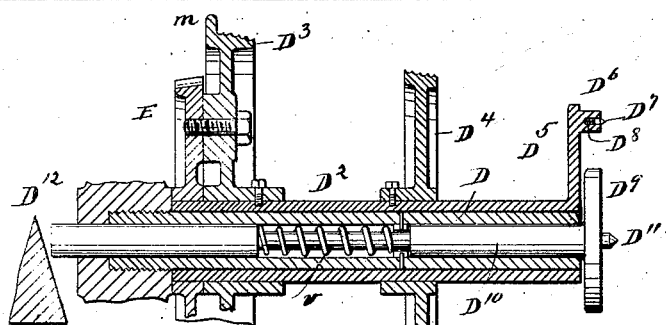
Witnesses
Peter Albertine
A. Albertine
J. Farrell, Inventor
By his Attorney
Oscar F. Gunz No. 828,278. PATENTED AUG. 7, 1906.
J. FARRELL.
MACHINE FOR MAKING BASKETS.
APPLICATION FILED SEPT. 25, 1897.

5 SHEETS—SHEET 3.

Witnesses
Peter Albertine jr.
A. Albertine

J. Farrell Inventor
By his Attorney

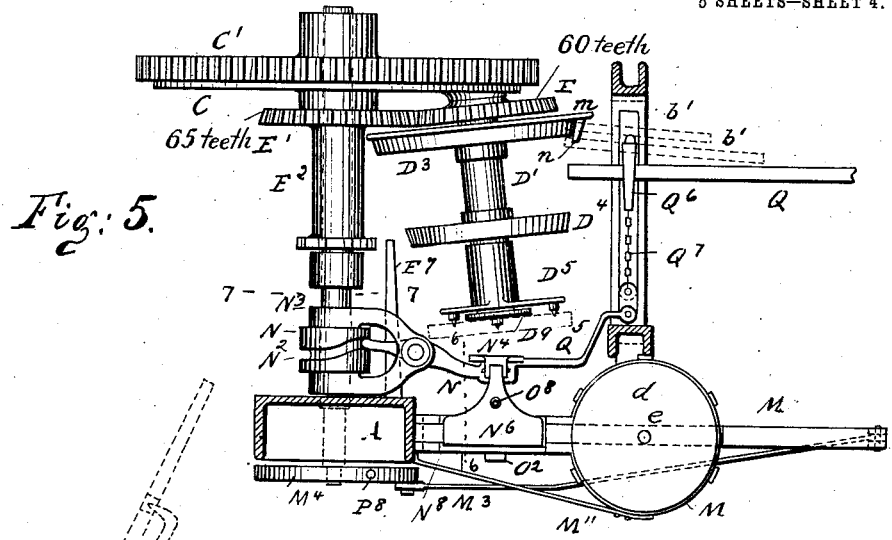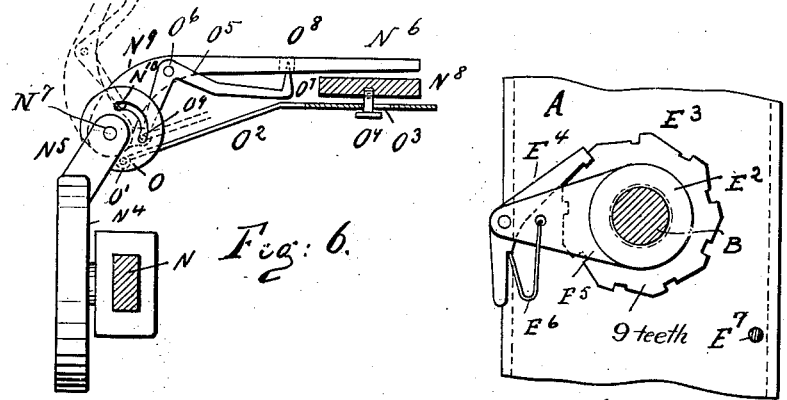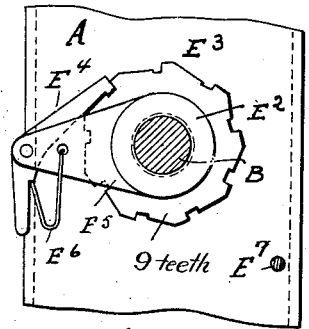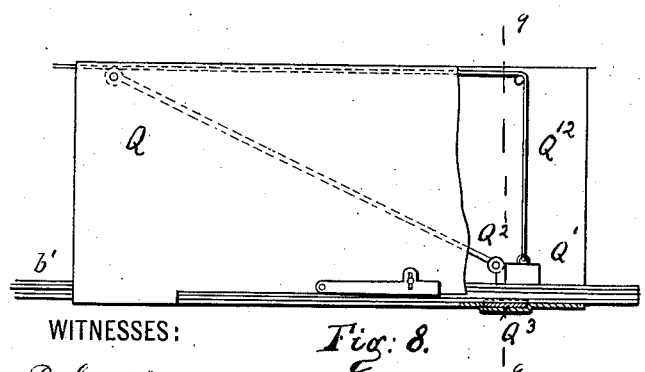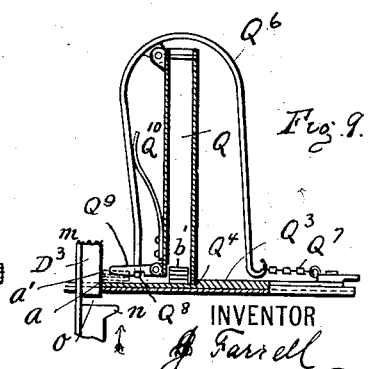

No. 828,278. PATENTED AUG. 7, 1906.
J. FARRELL.
MACHINE FOR MAKING BASKETS.
APPLICATION FILED SEPT. 25, 1897.
5 SHEETS—SHEET 5.
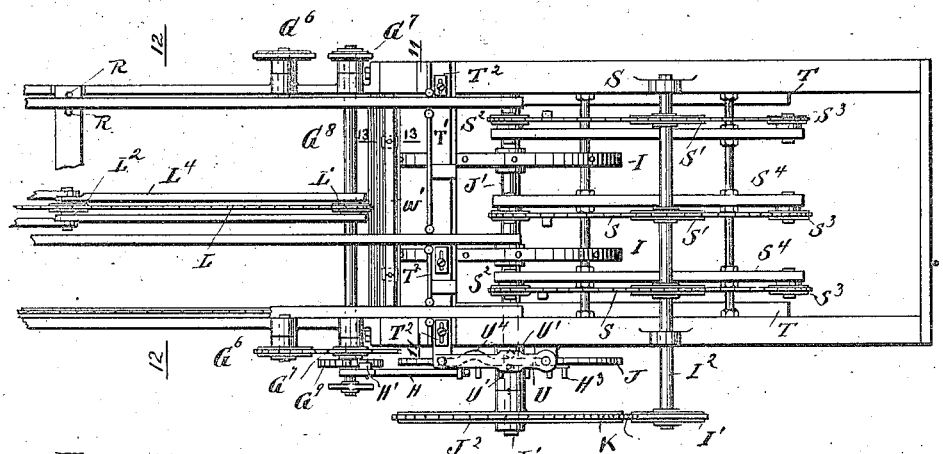
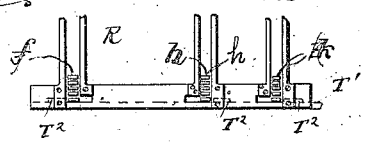
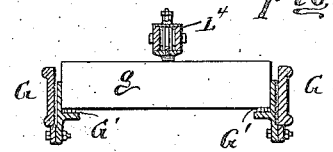
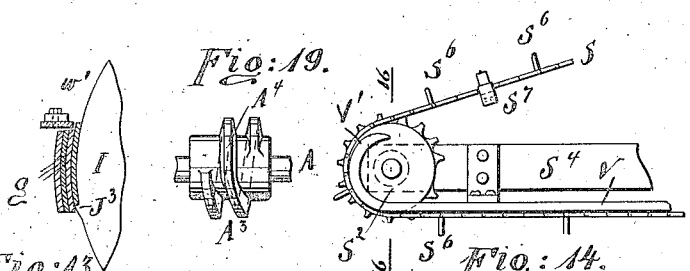
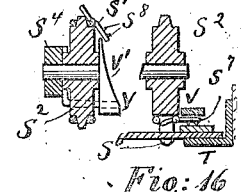
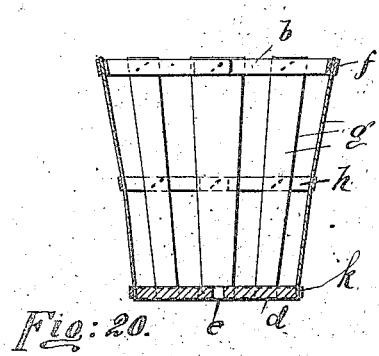
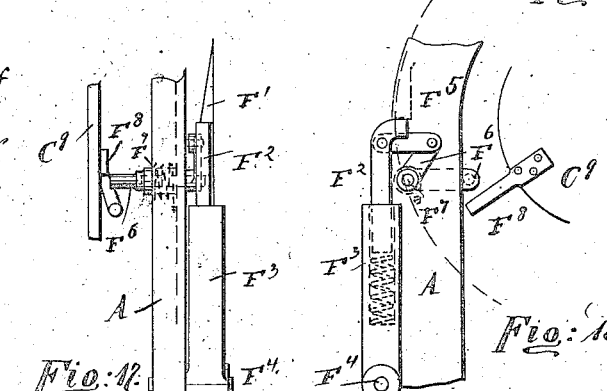
Witnesses
Peter Albertine Jr.
A. Albertine
J. Farrell Inventor
By his Attorney
Oscar J. Gunz

UNITED STATES PATENT OFFICE.

JOHN FARRELL, OF NEWTON, NEW JERSEY, ASSIGNOR OF ONE-FOURTH TO JAMES A. WATSON, OF WASHINGTON, DISTRICT OF COLUMBIA.

MACHINE FOR MAKING BASKETS.

No. 828,278.        Specification of Letters Patent.        Patented Aug. 7, 1906.

Application filed September 25, 1897. Serial No. 652,992.

*To all whom it may concern:*

Be it known that I, JOHN FARRELL, a citizen of the United States, and a resident of Newton, in the county of Sussex, in the State of New Jersey, have invented certain new and useful Improvements in Machines for Making Baskets, of which the following is a specification.

This invention relates to machines for making wooden baskets, and more especially to machines for making that class of such baskets having wooden bottoms, upright staves, and a series of inner and outer hoops secured thereto.

The object of the invention is to provide a machine for making such baskets which will automatically take the previously-cut bottoms from a holder, apply the staves in proper positions, apply the inner and outer hoops, nail them to the staves and the staves to the bottom, and eject the completed baskets.

The machine I have produced is strong, acts automatically and reliably throughout, and can be started and stopped at will.

Figure 3:
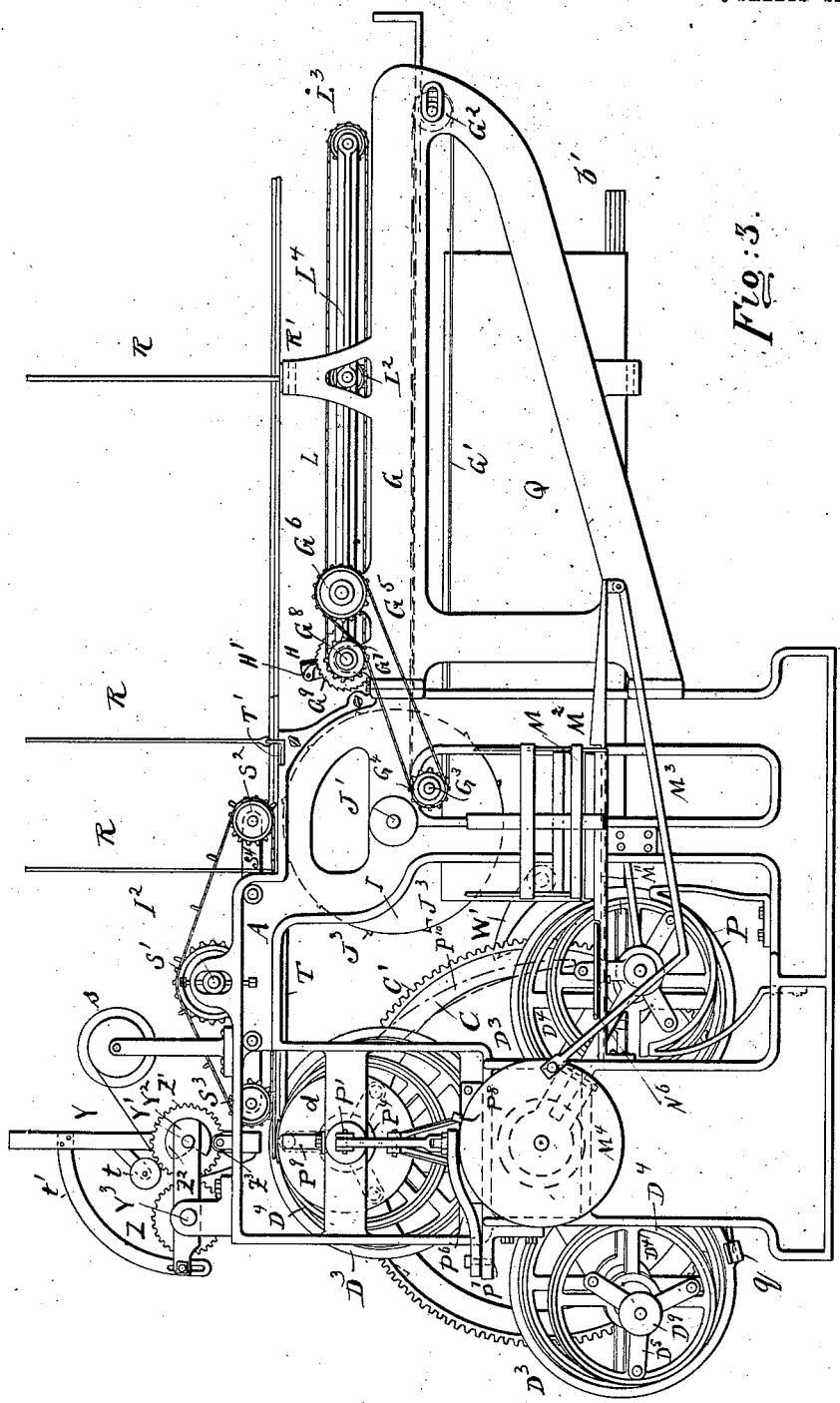
Figure 4:
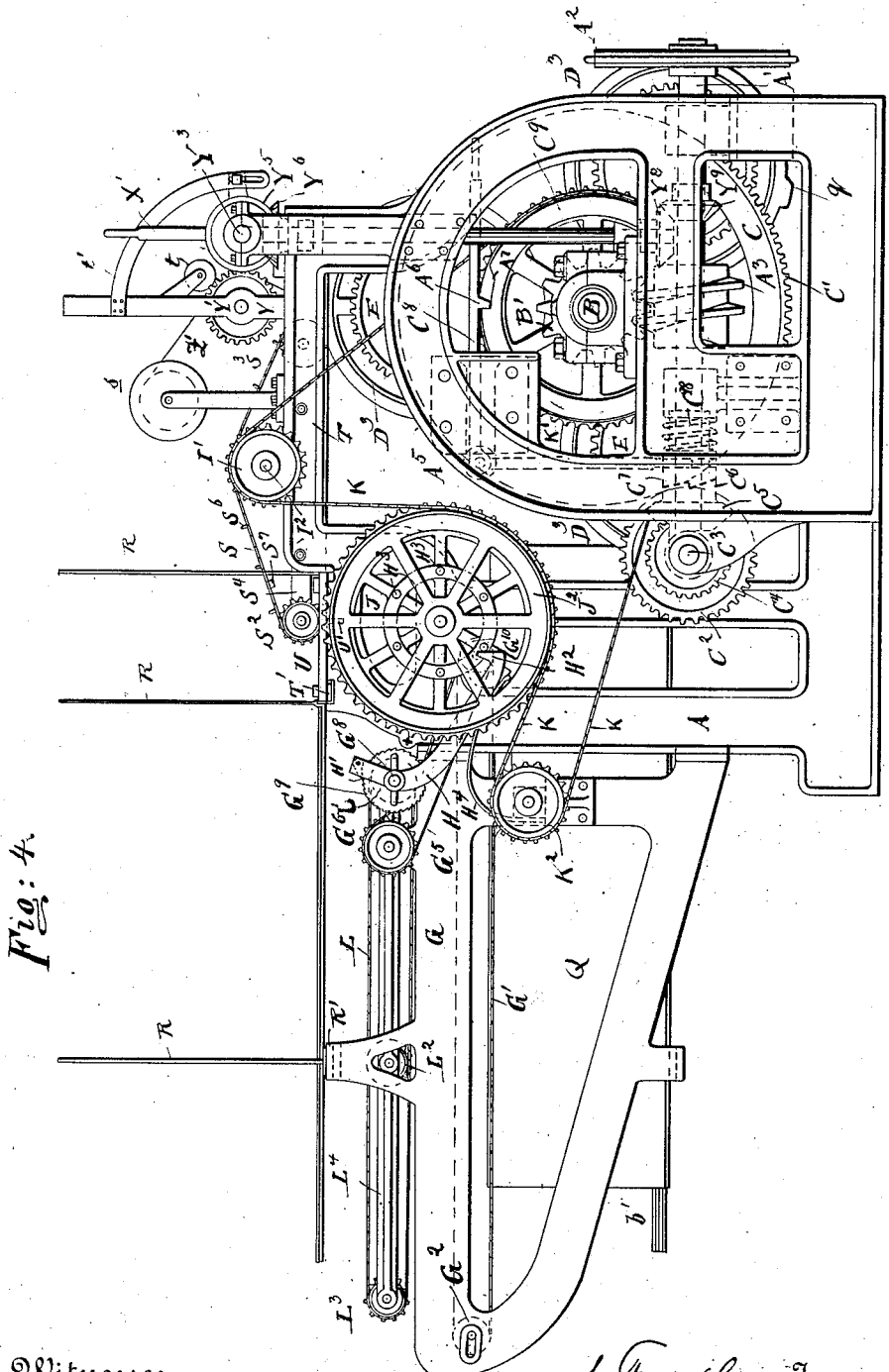

In the accompanying drawings, forming a part of this specification, and in which like reference-signs indicate like parts in all the figures, Figure 1 is a front end elevation of my improved basket-making machine. Fig. 2 is a detail longitudinal sectional view of the form, parts being omitted. Fig. 3 is an elevation of one side of the machine. Fig. 4 is an elevation of the other side. Fig. 5 is a sectional plan view showing the mechanism for feeding the basket-bottoms and inner hoop-strips. Fig. 6 is an enlarged detail vertical sectional view on the line 6 6 of Fig. 5. Fig. 7 is an enlarged detail vertical sectional view on the line 7 7 of Fig. 5. Fig. 8 is a side view of the box for the inner hoop-strips, parts being broken away and others in section. Fig. 9 is a vertical sectional view on the line 9 9 of Fig. 8. Fig. 10 is a plan view of the upper part of the machine, showing the mechanism for feeding and conveying the outer hoop-strips and for conveying the staves. Fig. 11 is an end view on the line 11 11 of Fig. 10. Fig. 12 is a vertical sectional view through the stave-feeder on the line 12 12 of Fig. 10. Fig. 13 is an enlarged detail vertical sectional view of the stave-carrier on the line 13 13 of Fig. 10. Fig. 14 is an enlarged detail side view of the chain and cam-track for feeding staves and outer hoops. Fig. 15 is an end view of parts shown in Fig. 14, parts being in section. Fig. 16 is a vertical sectional view on the line 16 16 of Fig. 14. Figs. 17 and 18 are detail views of the cushioned stop-bolt and means for operating it. Fig. 19 is a detail view of the worm. Fig. 20 is a vertical transverse sectional view through the basket made by the machine.

The entire mechanism is contained in a frame A of suitable construction, shape, and strength. All of the mechanism is driven from a shaft A', extending lengthwise of the machine-frame and provided at its front end with a sprocket-wheel $A^2$ or pulley, over which a suitable chain or belt passes, and this wheel $A^2$ may be fixed on the shaft A', or it may be provided with a clutching device of any approved construction for locking it on the shaft A' at will.

The shaft A' is provided with a heavy worm $A^3$, engaging a worm-wheel B', fixed on the shaft B, mounted transversely in the machine-frame, so that the shaft B is driven from the shaft A' by means of said worm and worm-wheel, which worm-wheel may, however, have a clutch, if desired, for engaging or disengaging it from the shaft at will.

The thread of the worm $A^3$ has a certain pitch; but parts of the thread are made straight, as at $A^4$ in Fig. 19, whereby the shaft B is rotated with interruptions—that is to say, it remains at rest for short periods—when the straight parts $A^4$ engage the worm-wheel for a purpose to be set forth hereinafter.

A circular form-carrier C is loosely mounted on the shaft B and on its rim is provided a cog-ring C', which engages a cog-wheel $C^2$, fixed on a short transverse shaft $C^3$, carrying a bevel-pinion $C^4$, having fifteen teeth engaging a bevel cog-pinion $C^5$, having eighteen teeth formed on a clutch member $C^6$, mounted loosely on the rear end of the shaft A' and normally engaged with a clutch member $C^7$, mounted on the shaft A', to turn with and slide on it, the clutch member $C^7$ being pressed by a helical spring $C^{18}$, surrounding the shaft A', toward and into engagement with the clutch member $C^6$.

A forked angle-lever $C^8$, pivoted to the frame A at $A^5$, engages the sliding clutch member $C^7$ and is provided with a toe $A^6$, resting on the rim of a cam-wheel C⁹, fixed on the shaft B, and provided with a cam-recess A⁷. The clutch members C⁶ C⁷ thus remain disengaged, excepting when the toe A⁶ drops into the recess A⁷. From the circular frame C three arms D, which are equidistant from each other, extend outward at a slight angle, as shown in Fig. 1, and each arm carries a basket-form D', composed, essentially, of a sleeve D², carrying at its inner end a circular frame or disk D³ of a diameter equal to the inner diameter of the inner top hoop b of the basket, Fig. 20, said disk having its rim slightly beveled and provided with slight circumferential grooves, as shown in Fig. 2, or provided with serrations for the purpose of turning and clenching the ends of staples or nails.

About midway of the length of the sleeve D² a circular frame or disk D⁴ of less diameter is formed on the same, and this also has its rim beveled and provided with grooves or serrations. At its free end the sleeve D² has arms D⁵ of less length than the radius of the bottom d of the basket to be made, and from said arms bosses D⁶ project, each containing a pin D⁷, pressed outward by a spring D⁸ in the boss.

A disk D⁹ rests against the outer end of the sleeve D² and is secured on a spring-pressed rod D¹⁰, passing longitudinally and freely through the arm D, and said disk has a central pin D¹¹, adapted to pass into the central hole C of the basket-bottom d. Each basket-form sleeve D² carries at its inner end and outside of the disk D³ a cog-wheel E, having fifty-five teeth, and the three cog-wheels E of the three forms D' engage a cog-wheel E' of sixty teeth, so that each rotation of the cog-wheel E' causes each cog-wheel E and its basket-form D' to rotate one full turn and a fraction of a turn—in this case one-eleventh. The cog-wheel E' is fixed upon a sleeve E², loosely mounted on the shaft B and provided with a ratchet-wheel E³, having nine teeth, that can be engaged by an angular pawl-lever E⁴, pivoted to an arm E⁵ of the shaft B and pressed into engagement with the ratchet-wheel E³ by a suitable spring E⁶.

A rod E⁷, projecting from the frame, serves for disengaging the pawl-lever E⁴ from the ratchet-wheel E³ for the distance of one ratchet-tooth for each rotation of the shaft B. As the shaft B rotates the arm E⁵ carries around the pawl-lever E⁴, which by engaging the ratchet-wheel E³ turns the sleeve E² and cog-wheel E'; but just before the shaft B completes its rotation the lower end of the pawl-lever E⁴ strikes against the rod E⁷ and is disengaged from the ratchet-wheel until the next tooth of the ratchet-wheel is reached, as by that time the pawl-lever has slipped off the rod E⁷ and has by its spring been engaged with the ratchet-wheel. It follows that the shaft B has made one-ninth of a revolution without rotating the sleeve E², all for a purpose that will be set forth in the description of the operation of the machine.

The form-carrier C is provided on its outer side with three equidistant stop-lugs F', which can engage a cushioned bolt F² in the upper end of a bar F³, pivoted at F⁴ to the frame A. The cushioned bolt is connected by a pivoted link F⁵ (see Figs. 17 and 18) with one end of a spring-pressed bell-crank lever F⁶, pivoted to the frame A at F⁷. The other end of lever F⁶ extends into the path of lugs or projections F⁸ on the wheel C⁹, which act to trip said lever F⁶.

The staves g, which are all of the same size, are placed on edge between two horizontal guide-brackets G, projecting from the rear of the frame A and rest upon suitable guides, and two endless chains G' at the inner sides of the brackets G, which chains pass over the adjustable sprocket-wheels G² at the rear ends of the brackets G and over sprocket-wheels G¹⁰ on a transverse shaft G³ in the frame A and carrying at each end a sprocket-wheel G⁴, over which an endless driving-chain G⁵ passes, which also passes over an idle sprocket-wheel G⁶ on the top of each bracket G near the front end thereof. The said chains G⁵ are also engaged by two sprocket-wheels G⁷, fixed on a transverse shaft G⁸ above the chains G⁵.

The shaft G⁸ carries at one end a ratchet-wheel G⁹, engaged by a pawl H' on a pawl-lever H, mounted to rock on the shaft G⁸, and provided with a beveled toe H², on which pins H³ can act, which project laterally and equidistant from each other from a wheel J, fixed on the transverse shaft J', which shaft also carries a sprocket-wheel J². A spring H⁴, acting on the lever H, presses the same upward and into the path of the pins H³.

An endless chain K passes around sprocket-wheel K², under sprocket-wheel J², over sprocket-wheel I', and around the sprocket-wheel K' on shaft B. (See Figs. 1 and 4.) An endless chain L passes over the sprocket-wheel L' on the shaft G⁸ and over sprocket-wheels L² and L³ on a jointed frame L⁴, mounted on the shaft G⁸ and extending over the staves g, the bottom strand of said chain L resting on the top edges of the staves. On the shaft J' two disks I are fixed between the sides of the frame and have a circumference equal to the width of the number of staves required for the basket plus the width of one stave and intervening spaces, and each disk has on its rim a spur J³ for each part of its circumference corresponding to the width of a stave except one such space, which is left blank, so that the disks do not carry along a stave when this blank space arrives at the end of the group of staves being fed forward. The staves g are thus pressed toward the disks I, the end stave resting against the rims of the disks which lift it. The adjustable cross-piece W' prevents more than one stave being lifted at a time. (See Fig. 13.) The wooden basket-bottoms $d$ are placed one above the other into a vertical hopper or magazine M at one side of the machine-frame. Across the bottom M' of the hopper a slightly-beveled pusher $M^2$ is guided in a groove in the upper surface of the hopper-bottom, and a suitable guide and said slide is connected by a bent connecting-rod $M^3$ with a disk $M^4$ on the end of the shaft B outside of the machine-frame.

On the shaft B a collar N' is fixed, which has a cam-groove $N^2$, in which one end of a lever N works, which lever is pivoted to a yoke $N^3$ on the shaft B, and to the inner end of said lever N an upright piece $N^4$ is clamped, which is provided at its upper end with an arm $N^5$, to which a plate $N^6$ is pivoted by the pin $N^7$, which plate $N^6$ when in horizontal position and resting on the bar $N^8$ of the machine-frame serves for receiving the basket-bottom $d$, pushed by the pusher $M^2$ from the bottom of the hopper M and along a guide $M^{11}$.

The curved arm $N^9$ of the plate $N^6$ has a hole O, into which the bent end O' of a rod $O^2$ projects, which rod is provided at its opposite end with a longitudinal slot $O^3$, through which a pin $O^4$ projects into the under side of the bar $N^8$, whereby when the inner end of the lever N, Fig. 5, is moved to the left the plate $N^6$ is swung toward the left and into upright position, as shown in dotted lines in Fig. 6.

To prevent the basket-bottom from sliding off the plate $N^6$ prematurely, the angle-lever $O^5$ is pivoted at $O^6$ to the plate $N^6$ and is provided at one end with a pin $O^7$, which can pass through a hole $O^8$ in the plate $N^6$, and at its other end with a laterally-projecting pin $O^9$, which can travel in an eccentric-slot $N^{10}$ of the arm $N^9$, which slot is farther away from the pivot $N^7$ at its center than at its ends, so that as the plate $N^6$ swings upward the pin $O^7$ is gradually projected into the hole $e$ in the basket-bottom $d$ to prevent the bottom sliding off the plate $N^6$; but by the time the plate has arrived at its highest position the pin $O^7$ is withdrawn, and the basket-bottom $d$ can slide off the plate $N^6$, which latter is swung back into its initial position by the return movement of the cam-lever N. The basket-bottom when it slides off the plate $N^6$ drops into a recess P in the frame A, shaped to receive it, and by the piece $N^4$ during movement of the latter toward the left the basket-bottom is moved toward the end of that basket-form which at the time is adjacent to the recess P, whereby the basket-bottom is transferred to the basket-form, the central pin $D^{11}$ of the basket-form entering the central hole $e$ of the basket-bottom; and the basket-bottom is thus carried up with the basket-form, the bottom resting edgewise on the guides $P^{10}$, which prevent it from dropping off. When the form on which the bottom has been applied arrives at the highest position, the basket-bottom is forced against the spring-pins $D^7$ at the end of the basket-form by a disk-shaped striker P' on the end of a bolt $P^2$, guided in a sleeve $P^3$ on the frame A, to the outer end of which bolt is pivoted one end of a lever $P^4$, pivoted to an arm $P^5$ of the frame A, the lower end of which lever is pivoted to the free end of a cam-lever $P^6$, pivoted at $P^7$ to the frame A, and on which cam-lever the pin $P^8$, which projects from the rim of the wheel $M^4$, acts. A U-shaped spring $P^9$ has one end fastened to the sleeve $P^3$, and its other end bears against the back of the disk-shaped striker P'. (See Fig. 1.) When the pin $P^8$ begins to act on the cam-lever $P^6$, the striker P' is withdrawn and the spring $P^9$ brought in tension, and when the pin $P^8$ slides off the cam-lever $P^6$ the spring $P^9$ is suddenly released, and thereby the striker is caused to suddenly force the basket-bottom against the spring-pins $D^7$ on the end of the basket-form, which pins pass into the bottom a certain distance, and thus hold the bottom securely on the smaller end of the basket-form.

The wooden strips $b'$ for forming the inner hoop $b$ at the open end of the basket are contained in a longitudinal box Q; one strip resting on the other, as shown. (See Figs. 8 and 9.) A weight Q' in the box Q rests upon the uppermost strip $b'$ and is pivoted to a rod $Q^2$, pivoted at its upper end to the upper rear corner of the box Q. A cord $Q^{12}$ serves for raising the weight when a supply of strips is to be placed into the box. A slide $Q^3$, having a shoulder $Q^4$, is arranged below the box Q to slide transversely to the same, which slide is pivotally connected with the end of an arm $Q^5$, projecting from the inner end of the lever N, whereby said slide is reciprocated. A U-shaped lever $Q^6$ is pivoted at the top of the box Q, as shown in Fig. 9, and one end of it is connected by a chain $Q^7$ or other flexible connection with the slide $Q^3$. The other end of the lever $Q^6$ has a toe $Q^8$, which rests in a notch in the bottom edge of a latch $Q^9$, pivoted to the outside of the box Q at the bottom edge thereof.

A spring $Q^{10}$ acts on the lever $Q^6$ to throw the same to the left, Fig. 9. When the slide $Q^3$ moves to the left, Fig. 9, its shoulder $Q^4$ pushes the lowermost strip $b'$ in the box Q to the left and into the position shown in dotted lines at $a$, the strip remaining on the slide and its edge resting against the edge of the large end disk $D^3$ of the basket-form, which disk moves upward, as indicated by the arrow, said edge appearing in Fig. 9 as viewed from the inside. By the movement of the slide $Q^3$ to the left the chain $Q^7$ has been slackened. As the disk $D^3$ moves upward its nose $n$ strikes against the bottom surface of the strip $b'$, that has just been pushed by the slide against the edge of the disk $D^3$, and this nose lifts the strip and brings it into the position shown in dotted lines in Fig. 9 at $a'$, and thereby the latch $Q^9$ is lifted and releases the toe $Q^8$ of the lever $Q^6$, which lever is thrown by the spring $Q^{10}$ toward the left, Fig. 9, and forces the strip into the notch $o$ in the flange. The slide is then withdrawn by the action of the cam-groove $N^2$ on the cam-lever N, and the slide $Q^3$ is moved to the right. The toe $Q^8$ lifts and slides under the latch $Q^9$, which locks it, and thus holds it ready for the next strip, and so on. As the strip is drawn on by the rising of the form and partly wound upon the disk $D^3$, it is confined in place by the spring $p$, fastened to the disk C, which spring rests with its free end on the rim of the disk $D^3$ and at times is lifted off by two cam projections $q$ $q$ on the flange $m$.

The wooden strips for forming the three outer hoops $f$ $h$ $k$ are placed flat, one on top of the other, between three sets of vertical rods R, and said strips rest on suitable crosspieces $R'$ of the machine-frame. They are fed forward by three endless chains S, one for each set of strips, which chains pass over the sprocket-wheels $S'$ on the shaft $I^2$ and over the sprocket-wheels $S^2$ and $S^3$, mounted on pins on frame-rods $S^4$, said chains and strip-holders being so located as to feed the wooden strips at the proper places upon the basket-forms. The chains S are provided on the outer side with a series of equidistant lugs $S^6$, of which one is omitted on each chain for a purpose that will be set forth hereinafter, and these lugs serve for shifting forward the staves $g$, the ends of which rest on the guides T. Each chain S is also provided with a gripper $S^7$, hinged to one side, as shown in Figs. 15 and 16, and provided with spurs $S^8$, which can be forced into the hoop-strip, as shown in Fig. 16.

The front ends of the hoop-strips rest on a slide $T'$, arranged to reciprocate transversely to the length of the strips and pivotally connected at one end with a cam-lever U, pivoted to the frame and on which are two pins $U'$, on which the cam part $U^4$ of the wheel J acts, as shown in Fig. 10, so that the slide $T'$ is operated for each revolution of the wheel. The slide $T'$ has three shoulders $T^2$, which engage the lowermost strips and push them laterally into position—that is, close to the sprocket-wheels $S^2$—so that the grippers $S^7$ can seize them. As shown, two shoulders $T^2$ push the strips in place during the inward movement of the slide, while the third shoulder pushes the strip into place during the outward movement of the slide; but this arrangement can be varied, as it is now only made in the manner shown to economize in space.

Along one side of each chain S a bar V is arranged, which serves as guides for the chains and has its near end curved up and beveled to form a cam-track $V'$, which serves for bringing the gripper $S^7$ into horizontal position and to project laterally from the chain and to force the spurs $S^8$ on said gripper into the upper surface of the hoop-strip, as shown in Figs. 15 and 16, so that said chains and gripper feed the hoop-strip forward. When the gripper leaves the strip and moves upward and to the rear, the gripper hangs down at the outside of the chain, as shown in Fig. 15.

$W'$ is a check-pawl for the disk C.

The staves are fastened to the bottom $d$ and hoops $b$, $f$, $h$, and $k$ by wire staples made and driven by the machine, or in place thereof nails may be used which are driven by a suitable mechanism.

The staple formers and drivers Y are mounted on a shaft $Y'$, mounted in arms $Y^2$, which rock on a shaft $Y^3$, mounted transversely on the top and front of the machine-frame. A clutch member $Y^4$, mounted loosely on the shaft $Y^3$, is provided with a bevel cog-wheel $Y^5$, which is engaged by a bevel cog-wheel $Y^6$ on the upper end of a vertical shaft $Y^7$, carrying at its lower end a bevel cog-wheel $Y^8$, engaging a bevel cog-wheel $Y^9$ on the shaft $A'$. A clutch member X, mounted to turn with and slide on the shaft $Y^3$, can be engaged with the clutch member $Y^4$ by means of a lever $X'$. By means of the engaging cog-wheels Z and $Z'$ on the shaft $Y^3$ and on the staple-formers the latter, which may be of any approved construction, are driven. Each staple-former has a cam-wheel $Z^2$, running on a roller or wheel $Z^3$, whereby the staple-formers are permitted to drop upon the basket being formed at the proper time and are then immediately raised. The reels $s$ hold the wire for making the staples. $t$ represent guide-rollers for the wire, and $t'$ represent arms for adjusting the staple forming and driving mechanisms at the proper inclination.

The details of the staple forming and driving mechanism form no part of this invention, and hence are not illustrated nor described in detail.

A cam $D^{12}$, Figs. 1 and 2, on the fixed frame of the machine is located in the paths of the inner ends of the rods $D^{10}$, and as said rods move downward with the forms the rods are moved outward and the finished baskets are thereby discharged from the forms, preferably onto a suitable conveyer $w$. The springs V return the rods $D^{10}$ to their normal or inner positions.

Operation of the machine: To complete an eleven-stave basket, the form turns upon its axis eleven successive steps after the first stave is applied. At each of the first ten steps a stave is applied and the hoops are stapled to it. The eleventh step brings the first stave again under the staplers, and the rear ends of the hoops, which lap over said stave, are stapled, thus finishing the basket. The forms are then shifted to the succeeding station, the rear form being brought into position to receive the first stave for the next basket and the hoops being fed as heretofore described. The change of position of the form from one station to the next is effected in slightly less than the time required to apply and staple a single stave. Thus the machine is in operation practically continuously, a basket having eleven staves being completed for each twelve turns of the worm-shaft. The timing of the forms, the form-carrier, and the basket-feeding devices in the particular machine described and illustrated is as follows: The form-carrier moves one-third of a revolution, bringing the lower rear form to the upper station. The stave-feeding devices are so timed that the first stave and the outer hoops are applied to the form immediately on its arrival at the upper station. At this instant the "dwell" or non-active portion of the worm-thread becomes effective and holds the form from rotation, and the feeding mechanism inactive, while the staples are driven. The succeeding eleven turns of the worm feed the form forward eleven steps, during which ten additional staves are applied and the hoops stapled to them. The last step or movement brings the form to its initial position with the first stave under the stapling mechanism and the rear ends of the hoops lapped over their forward ends. During the moment the form stops in this position the final staples are driven, fastening the laps of the hoops down and completing the basket. While the movement is taking place which brings the laps to the stapling mechanism no stave is fed forward, owing to the blanks or non-feeding spaces in the stave-feeding wheels I. During the turn of the worm-shaft A', which succeeds the driving of the last staples, the clutch C⁶ C⁷ is thrown into action by the recess A⁷ of the wheel C⁹, and the form-carrier is moved forward one-third of a revolution, bringing the form with the complete basket to the front station and moving an empty form from the rear station to the upper station. In this manner the forms are moved successively to the upper front and rear stations.

In the machine illustrated the worm-gear has twelve teeth, the ratchet or notched wheel E³ has nine notches, and the circumference of the gear E' is to that of the gear E as twelve to eleven. At each station each form rotates through three hundred and sixty degrees, being always in gear with the common gear E'. In addition to this each form is rotated through one and one-eleventh turns, due to its bodily or orbital movement about the shaft B. Furthermore, as the worm A³ makes one complete revolution, giving the gear-wheel E' one-twelfth of a revolution, each time the forms are shifted from station to station the forms rotate an additional one-eleventh turn between each two stations; and thus gain three-elevenths in traveling the circle from the upper station back to said station. The sum of all of these rotations which a form makes on its own axis from the beginning of one basket until the beginning of the next basket on the same form would thus be four and four-elevenths turns, provided no compensating or retrograde movement took place.

In order that the first stave may be applied always at the same point on each form to preserve the proper relation between the first stave and the ends of the inside hoop, I provide for a loss of four-elevenths of a turn in each revolution of each form about the shaft B. This is the function of the pawl E⁴ and the arm E⁷. The pawl comes in contact with the arm once in each rotation of the shaft B, whereby the pawl is lifted out of engagement with a notch in the wheel E³ and moves forward into engagement with the succeeding notch. As there are nine of these notches, one-ninth of a rotation of the gear E' is lost each time the forms move from one station to the next and three-ninths or one-third of a rotation of E' is lost during a complete rotation of the carrier. One-third or four-twelfths of a rotation of E⁵ effects four-elevenths of a rotation of each of the form-carriers, which subtracted from four and four-elevenths turns leaves four complete turns. It thus appears that the net rotary movement of each form for each rotation of the carrier is just four turns. Hence the same point on each carrier will always receive the first stave.

While I have described a machine in which the movements of the carrier and the forms are timed as above, it will be evident that the principles of my invention are applicable to machines having different arrangements and different timings of the gearing. It is only necessary to present the same part of the form for the application of the first stave when a certain other part is always made to receive the end of the inner hoop. If, for instance, additional devices were provided for receiving the inner hoop at additional points on the form, it would be possible to apply the first staves at different points, it being only necessary or desirable to avoid lapping the inner and outer hoops at the same part of the periphery of the basket. The gearing described I have found very convenient in making eleven-stave baskets; but it will be understood that my invention is not limited to the manufacture of baskets of any particular number of staves and that the skilled mechanic will be able to adapt it to the manufacture of baskets of different forms, sizes, and proportions, as desired.

Having thus described my invention, what I claim, and desire to secure by Letters Patent, is—

1. In a basket-making machine, the combination of a form-carrier, a plurality of forms supported on said carrier, means for intermittently shifting the form-carrier, means for intermittently rotating the forms independently of the carrier, means for feeding staves, hoops and bottoms to said forms, and means for fastening said parts together on the forms.

2. In a basket-making machine, the combination of a form-carrier, a plurality of forms supported on said carrier, means for intermittently shifting the form-carrier, means for intermittently rotating the forms independently of the carrier, means for feeding bottoms to said forms successively, means for feeding the outer basket-hoops and the inner hoop for the basket-top to said forms successively, means for feeding staves to the forms, and means for fastening said staves, hoops and bottoms together on the forms.

3. In a basket-making machine, the combination of a form-carrier, a plurality of forms supported on said carrier, means for intermittently shifting the form-carrier, means for intermittently rotating the forms independently of the carrier, means for feeding bottoms to said forms while they are in one position, and means for feeding staves and hoops to the forms while in a succeeding position, and means for fastening the basket parts together while in the latter position.

4. In a basket-making machine, the combination of a form-carrier, a plurality of forms supported on said carrier, means for intermittently rotating the form-carrier, means for intermittently rotating the forms independently of the carrier, means for feeding bottoms to said forms while in one position, means for feeding staves and hoops to the forms while in the succeeding position, means for fastening said basket parts together, and means for discharging the baskets from the forms while the latter are in the third position.

5. In a basket-making machine, the combination of a form-carrier, a form supported on said carrier, means for intermittently-rotating the form-carrier to carry the form to different positions, means for intermittently rotating the form independently of the carrier, means for feeding the outer hoops and the inner hoop of a basket to said form, means for feeding staves to the form between the outer and inner hoops, means for feeding bottoms to the form, and means for fastening said basket parts together on the form.

6. In a basket-making machine, the combination of a form-carrier, a form supported on said carrier, means for intermittently rotating the form-carrier to carry the form to different positions, means for intermittently rotating the form independently of the carrier, means for feeding bottoms to the form while in one position, means for feeding the outer and inner hoops to the form while the latter is in the succeeding position, means for feeding staves to the form between said outer and inner hoops, and means for fastening said basket parts together on the form.

7. In a basket-making machine, the combination of a form-carrier, a plurality of forms on said carrier, magazines for holding supplies of staves, hoops and bottoms, means for automatically feeding the staves, hoops and bottoms to said forms, and means for fastening said parts together on the forms.

8. In a basket-making machine, the combination of a form-carrier, a plurality of intermittently-rotating forms on said carrier, magazines for holding supplies of staves, hoops and bottoms, means for automatically feeding bottoms, inner and outer hoops, and staves from the magazines to said forms in succession, and means for fastening said basket parts together on said forms.

9. In a basket-making machine, the combination of a rotating form-carrier, a plurality of forms supported by said carrier, means for rotating the form-carrier intermittently to move the forms from station to station, means for placing a bottom on each form at one station; means for supplying staves and inner and outer hoops to the form and attaching the same together to form a basket at the second station; and means for removing the basket while the form is at a third station.

10. In a basket-making machine, the combination of a rotating form-carrier and a series of forms carried thereby, said forms having their axes inclined to the axis of the form-carrier, for the purpose set forth.

11. In a basket-making machine, the combination of a form-carrier, means for intermittently rotating the same, a series of forms mounted on said carrier and having their axes inclined to the axis of the carrier, and means for intermittently rotating said forms, for the purpose set forth.

12. In a basket-making machine, the combination of a plurality of forms, means for intermittently rotating the forms, means for advancing the forms to successive positions, means for applying staves and hoops to said forms as they are rotated and means for fastening said basket parts together on the forms.

13. In a basket-making machine, the combination of a plurality of forms, means for intermittently rotating said forms, means for advancing said forms to successive positions, means for applying inner and outer hoops, staves and bottoms to said forms automatically, and means for fastening said basket parts together on the forms.

14. In a basket-making machine, the combination of a plurality of forms, means operated from a common source of power for imparting intermittent rotation to said forms, means for holding basket-bottoms on the forms, means for applying to said forms in succession the hoops and staves necessary to form baskets, and means for fastening said basket parts together on the forms.

15. In a basket-making machine, the combination of a form-carrier, a plurality of forms supported on said carrier, means for intermittently rotating the form-carrier, means for intermittently rotating the forms on their respective axes, means for applying to each of said forms in succession the elements of a basket, and means for simultaneously nailing or stapling said elements together.

16. In a basket-making machine, the combination of a form-carrier, a plurality of forms supported on said carrier, means for intermittently rotating the form-carrier, means for intermittently rotating the forms on their respective axes, automatic means for feeding and applying to each of said forms in succession the elements of a basket, and automatic means for simultaneously nailing or stapling said elements together to form complete baskets.

17. In a basket-making machine, the combination of a main driving-shaft, of a plurality of forms, means for automatically shifting the forms to successive positions, and means for automatically applying the various basket parts to said forms, and mechanism driven by the main shaft for independently operating said form-shifting means and said means for applying basket parts.

18. In a basket-making machine, the combination of a plurality of forms, means for automatically shifting the forms to successive positions, means for rotating the forms, means for feeding basket-bottoms, staves and hoops to said forms successively, and means for fastening said basket parts together on said forms.

19. In a basket-making machine, the combination with a main driving-shaft, of a plurality of rotatable basket-forms driven from said shaft, means for automatically shifting the positions of the forms, means for automatically applying different portions of basket material to the forms in their successive positions, means for rotating the forms, and means for fastening the basket parts together on said forms.

20. A basket-making machine comprising in combination with a basket-form and as a means for intermittently rotating and holding the same stationary, a driving-worm having active and inactive portions.

21. A basket-making machine comprising a combination with an intermittently-rotating form and means for feeding the parts of a basket thereto, a worm having active and inactive portions arranged to drive the feeding means in time with the rotation of the form.

22. A basket-making machine comprising a series of basket-forms and as a common means for intermittently rotating all the forms, a worm having active and inactive portions.

23. A basket-making machine comprising in combination a series of intermittently-rotated forms and means for feeding the parts of a basket thereto and as a means for intermittently operating such feeding means in time with the rotation of the forms, a worm having active and inactive portions.

24. A basket-making machine comprising a rotating form and means for feeding the parts of a basket thereto, and a common driving means for intermittently rotating such form and operating the feeding mechanism involving a worm with active and inactive portions.

25. In a machine for making baskets, the combination with a main shaft, of a rotatable form-carrier, rotatable basket-forms on the same, means for rotating the form-carrier from the main shaft to carry the forms to different positions, means for applying basket parts to the forms successively, a clutch for throwing the carrier-rotating mechanism into and out of gear with the main shaft, and means for automatically operating said clutch.

26. In a machine for making baskets, the combination with a main driving-shaft, of a basket-form, means for applying basket material automatically on said form, means for automatically securing the basket material together on said form, a worm on the main shaft, a worm-wheel on a driven shaft, and means for operating the material-feeding mechanism from said worm-wheel, the said worm having a thread with active and inactive portions.

27. In a machine for making baskets, the combination with a main driving-shaft, of a form-carrier, a plurality of basket-forms on the same, means for applying basket material automatically on the forms, a worm on the main shaft having a portion of its thread at right angles to its axis, a worm-wheel on a driven shaft, means for operating the material-feeding devices and rotating said forms from said driven shaft, means for automatically securing the basket material together while on a form, the form being adapted for clenching the securing devices, and means for operating said basket-securing devices from the main shaft independently of the shaft driven by the worm.

28. In a machine for making baskets, the combination with a main shaft and a driven shaft, of a form-carrier, a plurality of basket-forms on the same, means for applying basket material automatically on the forms, a worm having a portion of its thread at right angles to its axis, a worm-wheel on the driven shaft, and means for operating the material-feeding devices and rotating said forms from said driven shaft.

29. In a machine for making baskets, the combination with a movable form-carrier mounted in a frame, of a plurality of horizontally-rotatable basket-forms on the carrier, a receptacle for basket-bottoms, a receptacle for inner hoop-strips, a receptacle for staves, a receptacle for outer hoop-strips, means for applying a basket-bottom and an inner hoop-strip on a form, means for applying the staves and outer hoop-strips on the form at a later period, means for fastening the basket parts together, and means for removing the completed basket from the form.

30. In a basket-making machine, the combination having an automatic movable form-carrier, of rotative forms on the same, an inner hoop-strip receptacle, means for applying an inner hoop on the form when the form is in a position for receiving the same, and a guide for guiding the inner hoop while winding on the form.

31. A basket-making machine having a movable form-carrier, the combination of rotary forms on said carrier, means for automatically applying a basket-bottom on a form while in one position, means for engaging the end of an inner hoop with said form while the form is in the position for receiving the bottom, means for applying the staves and outer hoops on said form, basket-bottom and inner hoop after the form has changed its position, and means for fastening the staves to the hoops and bottom successively as said staves and hoops are applied, and means for automatically releasing the completed basket.

32. A basket-making machine having a movable form-carrier and rotating forms thereon, means for automatically applying bottoms, hoops and staves on said forms and for producing such relative motion thereof as to wind the hoops more than a complete circumference of the form.

33. In a basket-making machine, having a movable form-carrier, the combination of a rotary form on said carrier, means for automatically removing a basket from the form while in one position, means for automatically applying the inner hoop and a bottom on the form while in a second position, and means for applying the staves and outer hoops and securing devices while the form is in a third position.

34. A basket-machine having a form-carrier and forms on the same, means for giving the form-carrier intermittent motion to change the positions of the forms, and means for rotating said forms on their own axes intermittently while the forms are in position for receiving parts of the basket to be made.

35. A basket-making machine having a form-carrier and forms on the same, means for giving the form-carrier intermittent motion to change the positions of the forms, means for rotating said forms on their own axes intermittently only, and means for automatically driving staples on the forms during the interruption of the rotary movement of the forms.

36. A basket-making machine having a rotary form-carrier, means for rotating the form intermittently on its own axis, means for automatically applying hoops and staves on the form, a staple-driving mechanism for driving staples through the hoops and staves on the form, and means for automatically operating the staple-driving mechanism to drive staples during the intermissions of the rotary movement of the form on its axis.

37. In a machine for making baskets, the combination with a main frame of a rotary form-carrier, forms mounted on said carrier, means for properly supplying staves, hoops and basket-bottoms to said forms, mechanism for applying securing devices to said staves, hoops and bottoms, and means for bringing one form into operative position with relation to said devices and withdrawing another.

38. In a machine for making baskets, the combination with a main frame of a rotary form-carrier supported therein, gearing for rotating the same, forms mounted on said carrier, means for properly supplying hoops, staves and basket-bottoms to said forms, mechanism for applying securing devices to said staves, hoops and bottoms, and means for bringing one form into operative position to said devices and withdrawing another, and means for removing completed baskets from said forms.

39. A basket-machine having a rotary form and means for first applying automatically a basket-bottom, and an inner hoop for the open end of the basket on said form, means for then shifting the form into another position and means for then applying automatically staves and outer hoops on said form and the inner hoop, and basket-bottom thereon.

40. A basket-making machine having a movable form-carrier, a rotary form on said carrier, means for automatically applying a basket-bottom on the form, and means for engaging the end of a strip for forming a hoop on said form while the form is in one position, means for applying the staves and hoops on said form, basket-bottom and inner hoop while the form is in a second position, and means for nailing the staves to the hoops and bottoms successively as said staves and hoops are applied.

41. In a basket-making machine, the combination of a main frame, a shaft mounted therein, means for rotating the same, a rotating form-carrier mounted on said shaft, means for rotating the same intermittently, forms on said carriers, means for rotating the same a complete turn while the form-carrier is at rest, means for applying staves, hoops and basket-bottoms on said forms, and mechanism for applying securing devices to said hoops, staves and bottoms on said forms, and means for removing completed baskets from said forms.

42. A basket-making machine having a rotating shaft, a form-carrier loosely mounted on said shaft, forms on said carrier, gearing for rotating said forms, a sleeve on the driving-shaft, for operating said gearing, a pawl and ratchet for rotating said sleeve from the shaft, means for throwing out said pawl at intervals, and means for applying basket-bottoms, hoops and the staves on said forms.

43. A basket-making machine having a rotating shaft, a form-carrier loosely mounted on said shaft, forms on said carrier, gearing for rotating the forms, a sleeve on said shaft, which sleeve operates said gearing, means for rotating the sleeve with the shaft, means for disengaging the shaft at intervals, and means for applying hoops, staves and basket-bottoms on the forms.

44. In a basket-making machine, the combination with a basket-form, of a stave-receptacle in which the staves are held, chains engaging the edges of the staves to feed them forward, rotating disks against which the staves are pressed by the chains, which disks have rim projections for engaging the staves and means for moving the staves from said disks to the form.

45. In a basket-making machine, the combination with a basket-form, of a stave-receptacle, means for feeding the staves forward in said receptacle, rotating disks against which the staves are pressed by said means, which disks have rim projections for engaging the staves, and means for moving the staves from said disks to the form.

46. In a basket-making machine, the combination with a basket-form, of a stave-receptacle, means for feeding the staves forward, rotating disks against which the staves are pressed by said means, which disks have projections on the rim for engaging the staves, and chains for conveying the staves to the form.

47. In a basket-making machine, the combination with a basket-form, of a stave-receptacle in which the staves are held on edge, chains for feeding the staves forward, rotating disks against which the staves are pressed by the chains, which disks have devices on the rims for engaging the staves and giving them a quarter-turn and chains for conveying the staves to the form.

48. In a basket-making machine, the combination with a basket-form, of a stave-receptacle, feeding-chains engaging the upper edges of the staves in the receptacle, and feeding-chains engaging the lower edges of the staves therein, and means for conveying the staves to the form.

49. In a basket-making machine, the combination with a basket-form, of a stave-receptacle, in which the staves are held on edge, chains for shifting said staves forward, rotating conveyer-disks against the edges of which the staves are pressed by the chains, and means for operating said chains intermittently.

50. In a basket-making machine, the combination with a form, of chains having lugs for conveying staves to the form, grippers hinged to said chains for gripping and feeding hoop-strips to the form, and a cam-track adjacent to each chain for swinging the grippers over the hoop-strips and holding them down on the hoop-strips.

51. In a basket-making machine, the combination with a rotary basket-form and a rotary form-carrier, of chains for conveying staves and hoop-strips to the form, grippers on said chains for gripping the hoop-strips, receptacles for the hoop-strips and a slide for slipping the ends of the hoop-strips laterally into the path of the grippers on the chains.

52. In a basket-making machine, the combination with a form, of chains for conveying staves and hoop-strips to the form, grippers on said chains for gripping the hoop-strips, receptacles for the hoop-strips, and a reciprocating slide for shifting the ends of the hoop-strips laterally into the paths of the grippers.

53. In a basket-making machine, the combination with a form, of means for applying staves, hoops and basket-bottoms of the form, a staple-driving mechanism, and means for lowering said staple-driving mechanism upon the work once for each stave on the form.

54. In a basket-making machine, the combination with a receptacle for staves and receptacles for hoop-strips of intermittently-moving chains forcing the staves forward in their receptacle, a slide for shifting the ends of the hoop-strips laterally, and a cam-wheel for actuating the said slide and the mechanism for operating the stave-feeding chains intermittently.

55. In a basket-making machine, the combination with a shaft and a sleeve on said shaft, of a spring-pawl on an arm of said shaft, a ratchet-wheel on the sleeve engaged by said pawl, a fixed rod for tripping the pawl for each rotation of the shaft, a form-carrier mounted loosely on the shaft, rotary forms on said carrier, a cog-wheel on each form, a cog-wheel on the sleeve, engaging the cog-wheels on the forms, the cog-wheel on the sleeve having more teeth than the cog-wheel on the forms, and means for applying staves, hoops and basket-bottoms on the forms.

56. In a basket-making machine, a tapering form provided along its larger end with a flange having a notch and a toe adjacent to said notch, in combination with a trigger to be tripped from said toe, and a spring for feeding a hoop, which spring can be released by said trigger.

57. In a basket-making machine, the combination with a form-carrier, of a rotary form on the same, which form is provided at its end with a flange having cam projections, and a spring-arm attached to the carrier and resting on the flange of the form and on that part of the form adjacent to the flange.

58. In a basket-making machine, the combination with a form having pins at one end, of a striker for driving a basket-bottom against said pins, a spring acting on said striker and mechanism for automatically bringing said spring in tension and then releasing it, to drive the striker against the basket-bottom.

59. In a basket-making machine, the combination with a hopper for basket-bottoms, of a rotating-form-carrier, forms on the same, a slide for removing the bottoms from the hopper, a tilting-plate having a hole, a lever on said plate, which lever has a pin arranged to pass through said hole, means for operating said lever to cause the pin to pass through the hole in the bottom when the plate is tilted, and means for tilting the plate and withdrawing the pin after the plate has been tilted.

60. In a basket-making machine, the combination with a shaft, of a form-carrier, forms on the same, a hopper for basket-bottoms, a slide for removing the basket-bottoms from the hopper, which slide is operated from the said shaft, a tilting-plate for receiving and tilting up the bottoms, and means for operating the tilting-plate from said shaft.

61. In a basket-making machine, the combination with a hoop-strip receptacle, of a slide for shifting the ends of the strips laterally, a spring-pressed lever having a toe at its end, a latch for engaging said toe, an actuating connection between said lever and slide, and a rotating basket-form having a disk provided with a notch and a toe at said notch.

62. In a basket-making machine, the combination with a basket-form, of a hopper for basket-bottoms, a slide for removing the basket-bottoms successively from the hopper, means for operating said slide, a tilting-plate for receiving, holding and tilting up the bottoms, and means for operating the tilting-plate.

63. In a basket-making machine, the combination with a basket-form having retaining-pins on one end, of a hopper for basket-bottoms, means for successively removing the bottoms from said hopper, a tilting-plate for receiving, holding and tilting up the bottoms, and means for tilting said plate and pushing the bottoms against the retaining-pins.

64. In a basket-making machine, the combination with a form-carrier, of a shaft for the same, forms on the said carrier, which forms have retaining-pins on one end, a hopper for basket-bottoms, means for successively removing the bottoms from said hopper, a tilting-plate for receiving, holding and tilting up the bottoms, and a cam on the carrier-shaft for operating said tilting-plate and pushing the bottoms against the retaining-pins.

65. In a machine for making baskets, the combination with a rotary form, of a stave-receptacle, chains for feeding the staves forward toward the form, gearing for moving the chains, a spring trip-lever for actuating said gearing, and means for tripping said lever.

66. In a machine for making baskets, the combination with a rotary form, of a stave-receptacle, means for feeding the staves forward toward the form, gearing for operating said feeding means, a spring trip-lever for actuating said gearing, and means for tripping said lever.

67. The combination with a rotary form-carrier, of forms on the same, a shaft extending loosely lengthwise through each form, a disk on one end of said shaft and a fixed cam for coacting with the other end of the shaft, to shift said shaft lengthwise and move the disk from the end of the form, for the purpose set forth.

68. A basket-making machine having a rotary-form carrier, and means for rotating the same, means for automatically locking the carrier in place after a partial rotation, rotary forms on the carrier, means for rotating the forms intermittently a complete turn when the carrier is at rest, means for unlocking the carrier after the forms have made a turn, and means for applying staves, hoops and basket-bottoms on said forms.

69. In a basket-making machine, the combination with a form having pins at one end, of a striker for driving a basket-bottom against said pins, a spring acting on said striker and mechanism for automatically bringing said spring in tension and then releasing it, to drive the striker against the basket-bottom.

70. A machine for making baskets, comprising a frame, a form-support carried by said frame, a plurality of forms connected with said support, means for placing staves and hoops in position upon the respective forms, mechanism for applying securing devices to the staves and hoops, and power-operated mechanism operating to throw one form into operative position with relation to said securing devices as the other form is withdrawn from said operative position.

71. A machine for making baskets, comprising a frame, a form-support carried by said frame, a plurality of forms connected with said support, means for placing staves and hoops in position upon the respective forms, mechanism for applying securing devices to the staves and hoops, and automatic mechanism operating to throw one form into operative position with relation to said securing devices as the other form is withdrawn from said operative position.

72. In a machine for making baskets, the combination with a plurality of rotary forms, and means on the forms for clenching staples, of means for supplying basket material at intervals upon said forms, means for securing the basket material together on said forms while the latter are stationary, and means for stopping and locking in place the basket-forms automatically during the intervals between the applying of the material and power-operated means for shifting the forms to and from the material-securing means, substantially as herein shown and described.

73. In a machine for making baskets, the combination with a plurality of movable basket-forms, of means for applying basket material on said forms and means for applying securing devices and clenching the same to said basket material on the forms while the latter are locked, and means for automatically locking the basket-forms in place against any movement while applying the securing devices, and power-operated means for shifting the forms to and from the material-securing means, substantially as herein shown and described.

74. The combination with a movable form-carrier, of forms on the same, a shaft extending loosely lengthwise through each form, a means to support a basket-bottom at one end of said shaft and a means for coacting with the other end of the shaft, to shift said shaft lengthwise and eject the basket, substantially as herein shown and described.

75. In a machine for making baskets, the combination with a form-carrier and means for rotating the same automatically, of basket-forms on said carrier, means for giving each form a step-by-step rotation, means for automatically supplying material to the basket-forms, means for automatically applying securing devices to the basket material on the forms, the means for rotating the form-carrier and the forms being so gaged in relation to the speed of the devices for applying the securing means that the form rotates one step during the interval between two successive operations of the securing-means-applying devices, and the form-carrier moves the distance from one form to another during a like interval, substantially as herein shown and described.

In testimony that I claim the foregoing as my invention I have signed my name, in presence of two witnesses, this 28th day of August, 1897.

JOHN FARRELL.

Witnesses:
JENNIE GUNN,
JESSIE G. ROE.